(12) United States Patent
Dahle et al.

(10) Patent No.: US 11,607,079 B2
(45) Date of Patent: Mar. 21, 2023

(54) OUTDOOR COOKING STATION WITH WARMING CHAMBER AND METHOD THEREOF

(71) Applicant: North Atlantic Imports, LLC, Logan, UT (US)

(72) Inventors: Roger Dahle, Providence, UT (US); Jeffrey D. Clark, Logan, UT (US); Scott W. M. Stevenson, Smithfield, UT (US)

(73) Assignee: North Atlantic Imports, LLC, Logan, UT (US)

( * ) Notice: Subject to any disclaimer, the term of this patent is extended or adjusted under 35 U.S.C. 154(b) by 807 days.

(21) Appl. No.: 16/405,899

(22) Filed: May 7, 2019

(65) Prior Publication Data

US 2019/0343331 A1 Nov. 14, 2019

Related U.S. Application Data

(60) Provisional application No. 62/669,500, filed on May 10, 2018.

(51) Int. Cl.
  *A47J 37/07* (2006.01)
  *A23L 5/30* (2016.01)
  *A47J 37/06* (2006.01)

(52) U.S. Cl.
  CPC ............. *A47J 37/0713* (2013.01); *A23L 5/30* (2016.08); *A47J 37/0682* (2013.01); *A23V 2002/00* (2013.01)

(58) Field of Classification Search
  CPC ................ A47J 37/0623; A47J 37/0635; A47J 37/0652; A47J 37/0658; A47J 37/0682; A47J 37/0688; A47J 37/07; A47J 37/0704; A47J 37/0709; A47J 37/0713; A47J 37/0718; A47J 37/0727; A47J 37/0731; A47J 37/0754; A47J 37/0763; A47J 37/0786; A23L 5/10; A23L 5/15; A23L 5/30; A23V 2002/00
  USPC ......... 99/339, 340, 356, 447, 448, 449, 483; 126/3, 4, 6, 19.5, 25 R, 36, 55
  See application file for complete search history.

(56) References Cited

U.S. PATENT DOCUMENTS

| | | |
|---|---|---|
| 3,308,807 A | 3/1967 | Little et al. |
| 3,938,494 A | 2/1976 | Clark |
| 4,696,282 A | 9/1987 | Incitti |
| 5,189,945 A | 3/1993 | Hennick |
| 5,891,498 A | 4/1999 | Boehler |
| 6,041,773 A | 3/2000 | Rosenquist |
| 6,640,800 B1 | 11/2003 | Hodgson et al. |

(Continued)

*Primary Examiner* — Hung D Nguyen
(74) *Attorney, Agent, or Firm* — David L. Stott

(57) ABSTRACT

An outdoor cooking station configured to keep cooked food warm within a warming chamber of the cooking station. The cooking station includes a main body with frame components and panels, the panels coupled to the frame components so as to extend and define the warming chamber, the warming chamber positioned below heating elements supported by the main body. The warming chamber is fixedly positioned relative to the heating elements. The main body includes a door pivotably coupled to the main body and positioned along a front side of the main body, the door pivotally moveable between an open position and a closed position. With this arrangement, the door facilitates access to the warming chamber to place cooked food therein.

11 Claims, 8 Drawing Sheets

(56) References Cited

U.S. PATENT DOCUMENTS

| | | |
|---|---|---|
| 7,004,160 B1 | 2/2006 | Bates |
| 7,798,139 B2 | 9/2010 | Gagas et al. |
| 8,176,841 B2 | 5/2012 | Hatjopoulos et al. |
| 8,581,154 B2 | 11/2013 | Schwierking et al. |
| 9,492,031 B2 | 11/2016 | Diaz |
| 10,105,007 B2 | 10/2018 | Colston et al. |
| 2011/0095014 A1* | 4/2011 | Choi ................ E05D 11/1028 219/409 |
| 2014/0326232 A1* | 11/2014 | Traeger .............. A47J 37/0713 126/25 R |

* cited by examiner

OUTDOOR COOKING STATION WITH WARMING CHAMBER AND METHOD THEREOF

CROSS-REFERENCE TO RELATED APPLICATIONS

This application claims the benefit of U.S. Provisional Application No. 62/669,500, filed May 10, 2018, the disclosure of which is hereby incorporated by reference in its entirety.

TECHNICAL FIELD

The present invention relates generally to outdoor type cooking stations and, more specifically, the present invention relates to maintaining cooked food in a warm state with a warming chamber integrated with an outdoor type cooking station.

BACKGROUND

Barbequing has become a popular and pervasive tradition in much of the world. A barbeque grill is a device for cooking food by applying heat directly below a grill. There are several varieties of grills but most fall into one of two categories, either gas fueled or charcoal. Gas fueled grills typically use propane or natural gas as a fuel source, with the gas flame either cooking the food directly or heating grilling elements which in turn radiate the heat necessary to cook the food. Grilling has become a popular method of cooking food due to the unique flavors and texture imparted to the food during the grilling process.

A griddle is a cooking device consisting of a broad flat surface that can be heated using a variety of means and is used in both residential and commercial applications for a variety of cooking operations. The griddle is most commonly a flat metal plate composed of cast or wrought iron, aluminum or carbon steel. Griddles are commonly heated directly or indirectly by open flame or electrical elements. Using a griddle placed directly on a barbeque grill or over flame burners has also become popular when cooking foods not as well suited for cooking directly on a grill over an open flame.

Often large quantities of food are prepared outdoors with a griddle or grill type barbequing station. At such times, difficulties arise with keeping the already cooked food in a warm state. Barbequing stations with pivotably attached hoods often include one or more racks that, when the hood is opened, the racks are positioned above and rearward of the cooking surface and, when the hood is closed, the racks typically move above the cooking surface and within the hood. As food is being cooked, one will typically place the already cooked food on the racks while continuing to cook on the cooking surface. However, with the hood open, the rack's position relative to the cooking surface typically will not keep the food sufficiently warm. Rather, to keep the food warm, one must close the hood of the barbequing station, which ends up interrupting the cooking process. Further, when the hood is closed, the temperature quickly rises to undesirable temperatures for the food being cooked on the grill or griddle as well as the already cooked food on the rack, often resulting in burning the food on the rack and sometimes causing the food to become dry. As such, it would be advantageous to have the ability to keep already cooked food warm without interrupting the cooking process and without causing the cooking temperature of the cooking station to reach undesirable cooking temperatures.

BRIEF SUMMARY OF THE INVENTION

The present invention is directed to various embodiments of an outdoor cooking station for cooking food and maintaining cooked food in a warmed state. In one embodiment, the outdoor cooking station includes a main body with frame components and panels, the panels coupled to the frame components so as to extend and define a warming chamber. The warming chamber is positioned directly below heating elements supported by the main body, the heating elements positioned below a cooking surface configured to be associated with the main body. Further, the warming chamber is fixedly positioned relative to the heating elements. The main body includes a door pivotably coupled to the main body and is positioned along a front side of the main body. With this arrangement, the door is pivotably moveable between an open position and a closed position such that, in the open position, the door exposes an opening defined in the front side of the main body to facilitate access to the warming chamber to place the cooked food therein.

In another embodiment, the main body includes a baffle extending to define an upper side panel and a front facing vent, the upper side panel positioned to at least partially define an upper side of the warming chamber, the front facing vent having openings defined therein and positioned above the door. In another embodiment, the main body includes a baffle extending with an upper side panel and a front facing vent, the front facing vent extending perpendicular relative to the upper side panel, the front facing vent positioned above the door with openings defined therein and the upper side panel partially defining the warming chamber.

In another embodiment, the door pivots adjacent a bottom edge of the opening defined in the front side of the main body. In another embodiment, the door is coupled to a hinge mechanism with a spring coupled thereto. In still another embodiment, the warming chamber includes a removable rack, the removable rack suspended over oppositely positioned ledges within the warming chamber.

In another embodiment, the warming chamber is at least partially defined by a bottom panel, a first panel, a second panel, and a rear panel, the first panel being positioned opposite the second panel, the rear panel being positioned opposite the door in the closed position, the warming chamber being at least partially open and exposed to the heating elements positioned above the warming chamber. In a further embodiment, the warming chamber includes one or more inside panels extending laterally relative to the rear panel, the one or more inside panels defining one or more vents therein to facilitate convection heat and radiation heat from the heating elements to heat the warming chamber. In another further embodiment, the warming chamber includes one or more inside panels extending laterally relative to the rear panel, the one or more inside panels extending to define an opening to facilitate convection and radiation heat from the heating elements to heat the warming chamber.

In another embodiment, the cooking surface includes a planar griddle surface. In yet another embodiment, the main body includes at least two legs with caster wheels coupled thereto.

In accordance with another embodiment of the present invention, an outdoor cooking station is provided. The outdoor cooking station includes a main body with frame components and panels, the panels coupled to the frame components so as to extend and define an upper chamber region and a lower chamber region. The upper chamber region includes multiple heating elements supported by the main body and disposed below an upper edge of the main body. The upper edge extends adjacent a cooking surface configured to be associated with the main body. The lower chamber region is fixedly positioned relative to the upper chamber region and disposed directly below the upper chamber region and the heating elements. The panels of the lower chamber region extend to define a bottom panel, a rear panel, a first panel and a second panel, the first panel being positioned opposite the second panel, the rear panel being positioned opposite a door pivotably coupled to the main body. The door is pivotably moveable to an open position to facilitate access to the lower chamber region.

In another embodiment, the main body includes a front facing vent panel with openings defined therein, the front facing vent panel positioned directly above the door. In another embodiment, the main body includes a baffle extending with an upper side panel and a front facing vent, the front facing vent extending perpendicular relative to the upper side panel, the front facing vent positioned above the door with openings defined therein and the upper side panel at least partially defining the warming chamber.

In another embodiment, the door is coupled to a hinge mechanism with a spring coupled thereto such that the door is biased to a closed position. In another embodiment, the lower chamber region includes a rack suspendably positioned between the first and second panels.

In another embodiment, the upper chamber region is separated from the lower chamber region with one or more inside panels, the one or more inside panels defining one or more vents therein to facilitate convection and radiation heat from the heating elements to heat the lower chamber region. In still another embodiment, the upper chamber region is separated from the lower chamber region with one or more inside panels, the one or more inside panels extending to define an opening along an edge of the one or more inside panels, the opening configured to supply heat to the lower chamber region from the heating elements. In another embodiment, the cooking surface includes a planar griddle surface.

In accordance with another embodiment of the present invention, a method for warming cooked food is provided. The method includes the steps of: providing an outdoor cooking station with a main body with frame components and panels, the panels coupled to the frame components so as to extend and define a warming chamber, the warming chamber positioned below heating elements supported by the main body, the heating elements positioned below a cooking surface configured to be associated with the main body, the warming chamber fixedly positioned relative to the heating elements, the main body including a door pivotably coupled to the main body and positioned along a front side of the main body, the door pivotably moveable between an open position and a closed position such that, in the open position, the door exposes an opening defined in the front side of the main body to facilitate access to the warming chamber to place the cooked food therein; heating the cooking surface with the heating elements for cooking food on the cooking surface; pivotably opening the door so as to expose an opening defined in the front side of the main body to facilitate access to the warming chamber; placing cooked food through the opening and within the warming chamber; and pivotably closing the door to the closed position to keep the cooked food warm within the warming chamber.

In another embodiment, the method further includes the step of facilitating air flow between the front side of the main body and the heating elements through a front facing vent positioned above the door. In another embodiment, the providing step includes providing a baffle to at least partially define an upper side of the warming chamber such that the baffle extends with a front facing vent positioned directly above the door.

In another embodiment, the method step of providing includes providing the door with a hinge and spring arrangement so that the door is biased toward the closed position. In another embodiment, the method step of providing includes providing the warming chamber with a removable rack positioned between the first and second panels. In another embodiment, the method step of heating includes supplying heat to the warming chamber with convection and radiation heat from the heating elements. In still another embodiment, the providing step includes providing one or more inside panels extending to define a separation between the heating elements and the warming chamber such that the one or more inside panels define one or more openings to facilitate supplying heat from the heating elements to the warming chamber.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
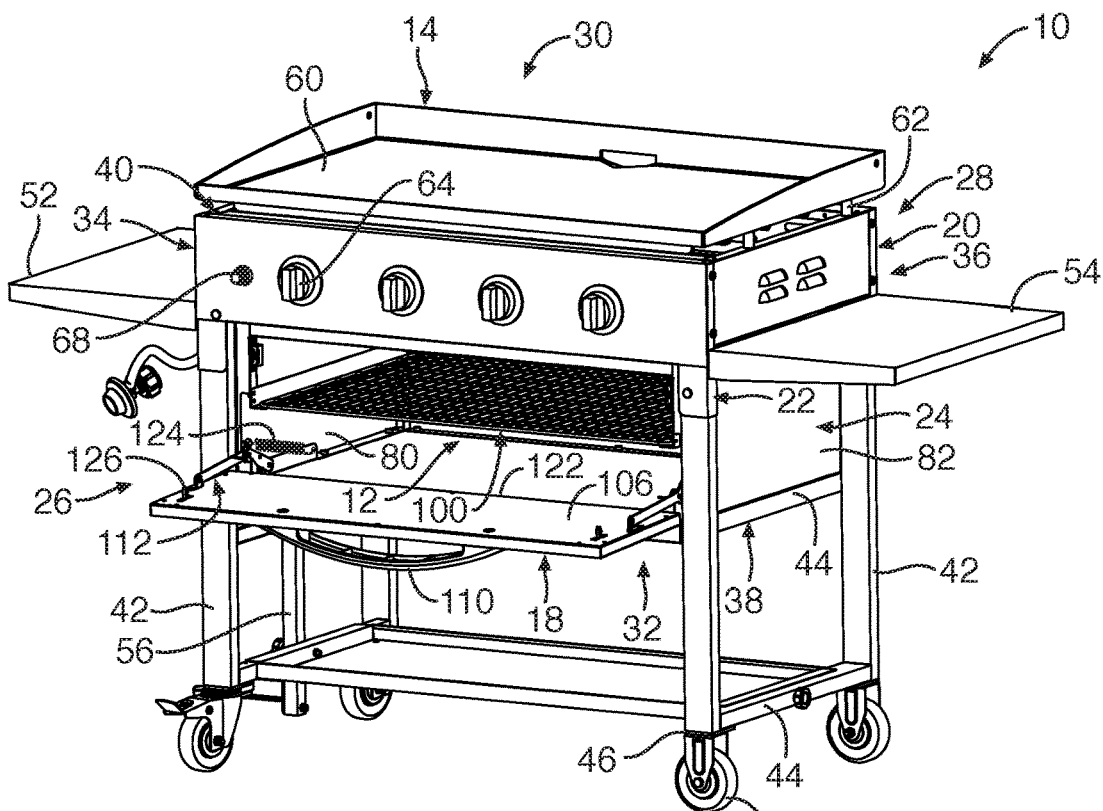
FIG. 1 is a right perspective view of an outdoor cooking station with a griddle member positionable over the cooking station, depicting a door in an open position to expose a warming chamber integrated within the cooking station, according to an embodiment of the present invention.
Figure 2:
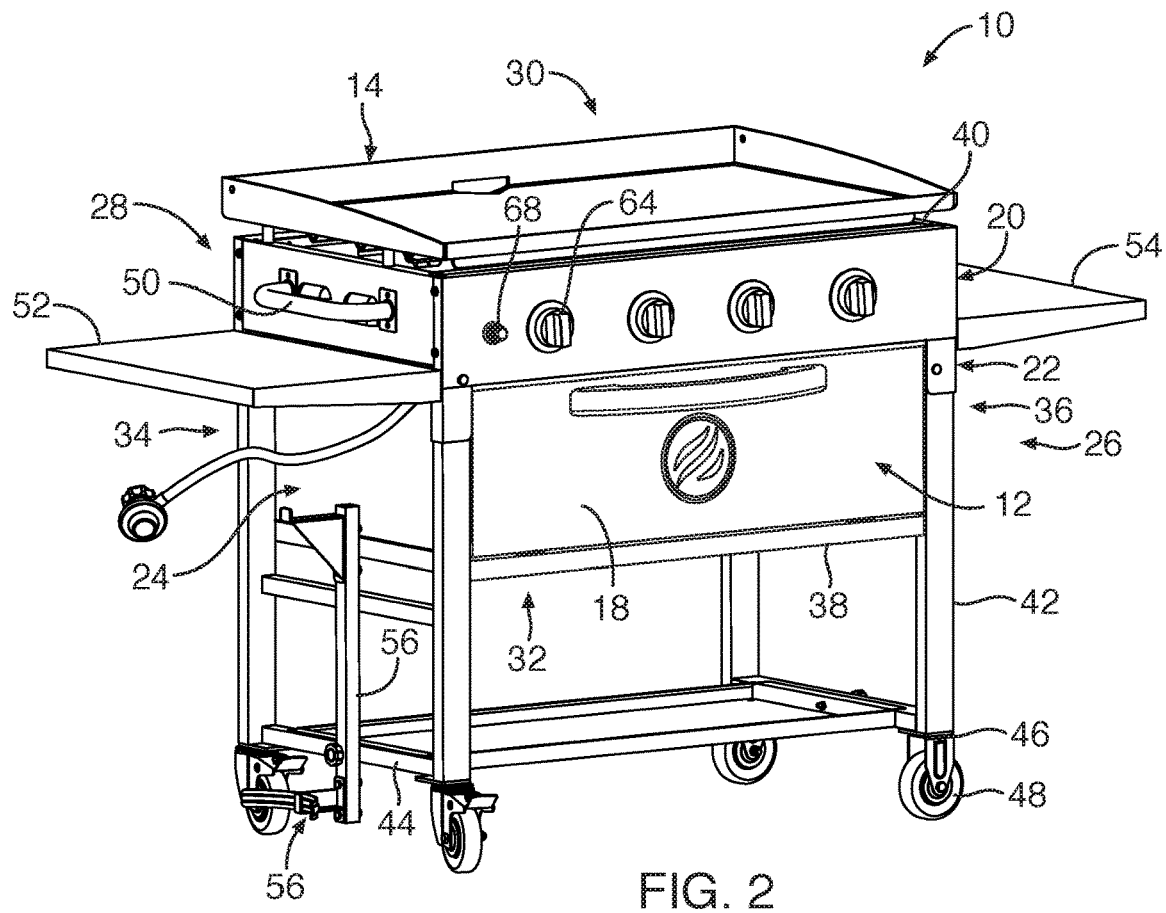
FIG. 2 is a left perspective view of the outdoor cooking station, depicting the door in a closed position, according to another embodiment of the present invention.

Referring to FIGS. 1 and 2, an outdoor cooking station 10 with a warming chamber 12, according to one embodiment of the present invention, is provided. The outdoor cooking station 10 may be sized and configured to be employed with a griddle member 14 and/or a grill type cooking surface or any other suitable cooking member or cooking surface for cooking food on the outdoor cooking station 10. The warming chamber 12 may be integrated with a region or chamber holding heating elements 16 (FIG. 3) of the cooking station 10 for cooking food. Further, the warming chamber 12 may be accessed with a door 18 that may be moved between an open position (FIG. 1) and a closed position (FIG. 2). In this manner, upon cooking food with the outdoor cooking station 10, the door 18 may be opened for placing cooked food within the warming chamber 12 and then moved to the closed position to maintain the heat within the warming chamber 12 and within the cooked food.

The outdoor cooking station 10 may include a main body 20 with various frame components 22 and panels 24 coupled to the frame components 22. The main body 20 may extend to define a front side 26, a rear side 28, a top side 30, a bottom side 32, a first side 34 and a second side 36. The first side 34 may be oppositely positioned relative to the second side 36 and may also be referenced as respective left and right sides. Similarly, the front side 26 may be oppositely positioned relative to the rear side 28, and the bottom side 32 may be oppositely positioned relative to the top side 34. Each of the front side 26, rear side 28, bottom side 32, and first and second sides 34, 36 may include one or more of the panels 24 and the frame components 22 that extend to surround and define the warming chamber 12 and heating elements 16 of the cooking station 10. The various frame components 22 may be coupled together to extend horizontally and vertically, as known by one in the art, to form the main body 20 with the panels 24 secured to the frame components 22, as previously set forth. Similarly, the panels 24 may extend horizontally between first and second sides 34, 36 and front and rear sides 26, 28 of the main body 20 as well as extend vertically between a lower end 38 or lower portion and an upper edge 40 of the main body 20.

In another embodiment, the frame components 22 may extend downward from the main body 20 to exhibit legs 42 of the main body 20 with various cross-members 44 between the legs 42. Such various cross-members 44 may extend and be secured along the lower end 38 of the main body 20 and, for example, extend adjacent ends 46 of the legs 42 to stabilize the structure of the outdoor cooking station 10. Further, the cooking station 10 may include caster wheels 48 securable to the ends 46 of the legs 42 to facilitate portability of the outdoor cooking station 10. As such, the outdoor cooking station 10 may be readily moveable with minimal effort so that the cooking station 10 is portable. Other components of the cooking station 10 may include one or more handles 50 coupled to one of the first and second sides 34, 36 of the main body 20. Further, the cooking station 10 may include a first side shelf 52 and a second side shelf 54 coupled to the first side 34 and second side 36 of the main body 20, respectively. In addition, the cooking station 10 may include a propane tank holder 56 coupled to one or more of the cross-members 44, the propane tank holder 56 configured to mount a propane tank (not shown) thereto.

Figure 3:
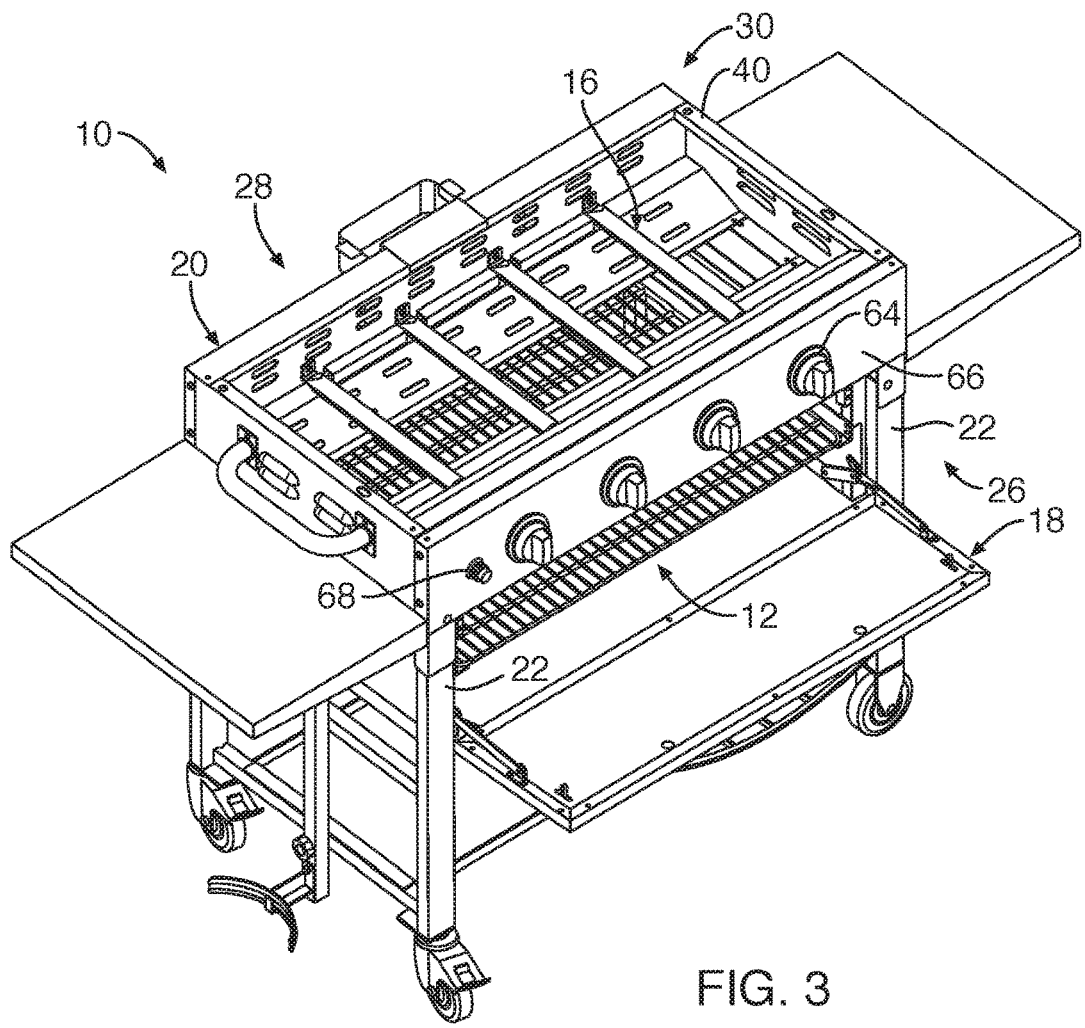
FIG. 3 is a top perspective view of the outdoor cooking station without the griddle member, depicting heating elements positioned within a main body of the outdoor cooking station, according to another embodiment of the present invention.
Figure 4:
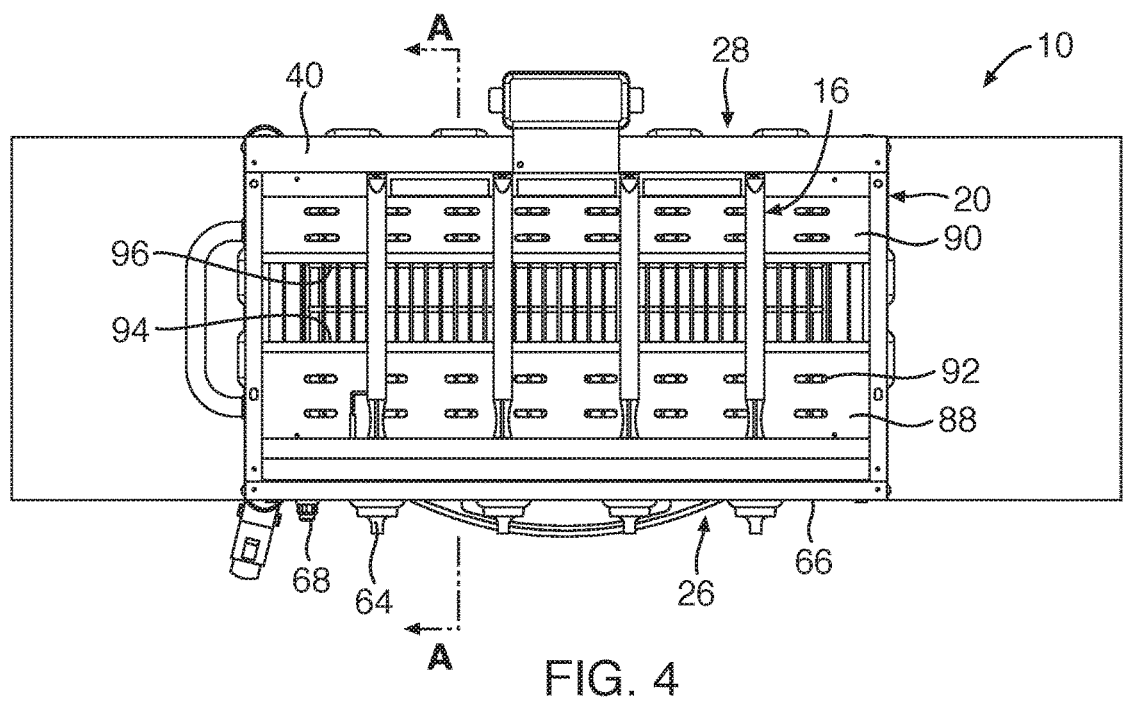
FIG. 4 is a top view of the cooking station, according to another embodiment of the present invention.

With reference to FIGS. 1, 3 and 4, the top side 30 of the main body 20 may include the upper edge 40 extending with some of the frame components 22 in a rectangular configuration so as to exhibit a rectangular periphery. The rectangular periphery of the upper edge 40 may also define a square periphery. The upper edge 40 may be disposed adjacent a cooking surface 60, such as the flat planar surface of the griddle member 14 associated therewith or any other type of cooking surface 60, such as a grill type cooking surface. The upper edge 40 may be sized and configured to receive, for example, small legs 62 of a griddle member 14 so that the upper edge 40 may support and stabilize the griddle member 14 thereon. In this manner, the upper edge 40 of the main body 20 and/or the cooking station 10 may be sized and configured to receive the griddle member 14. Further, in another embodiment, the cooking station 10 may include a hood (not shown) associated therewith that may be pivotably coupled to the rear side 28 of the main body 20 to be closeable over the upper edge 40 and over the cooking surface 60. Such hood may also be removable from the cooking station 10 without being pivotably coupled thereto.

As previously set forth, the front side 26 of the main body 20 may include the door 18 for accessing the warming chamber 12. Further, the front side 26 of the main body 20 may include multiple burner control valves 64 or knobs positioned over a front panel 66. Each of the burner control valves 64 or knobs may be associated with a heating element 16 or flame burners. The heating elements 16 may extend between the front side 26 and rear side 28 of the main body 20 below the upper edge 40 of the main body 20 such that the heating elements 16 may be secured to frame components 22 extending within and adjacently along the front and rear sides 26, 28 of the main body 20. Each of the heating elements 16 may hold structure for feeding pressurized fuel therethrough, such as propane gas or natural gas, and controlled with burner control valves 64 or knobs. In addition, the front panel 66 may include an ignitor switch 68 that may be depressed to provide a spark to ignite the gas fueled heating elements 16. The cooking station 10 may include typical components to facilitate igniting the heating elements 16 and heating the cooking surface 60 (FIG. 1) associated with the cooking station 10, such as various valves, tubing, manifold, gas couplings, fasteners, and any other components, as known to one of ordinary skill in the art.

Figure 6:
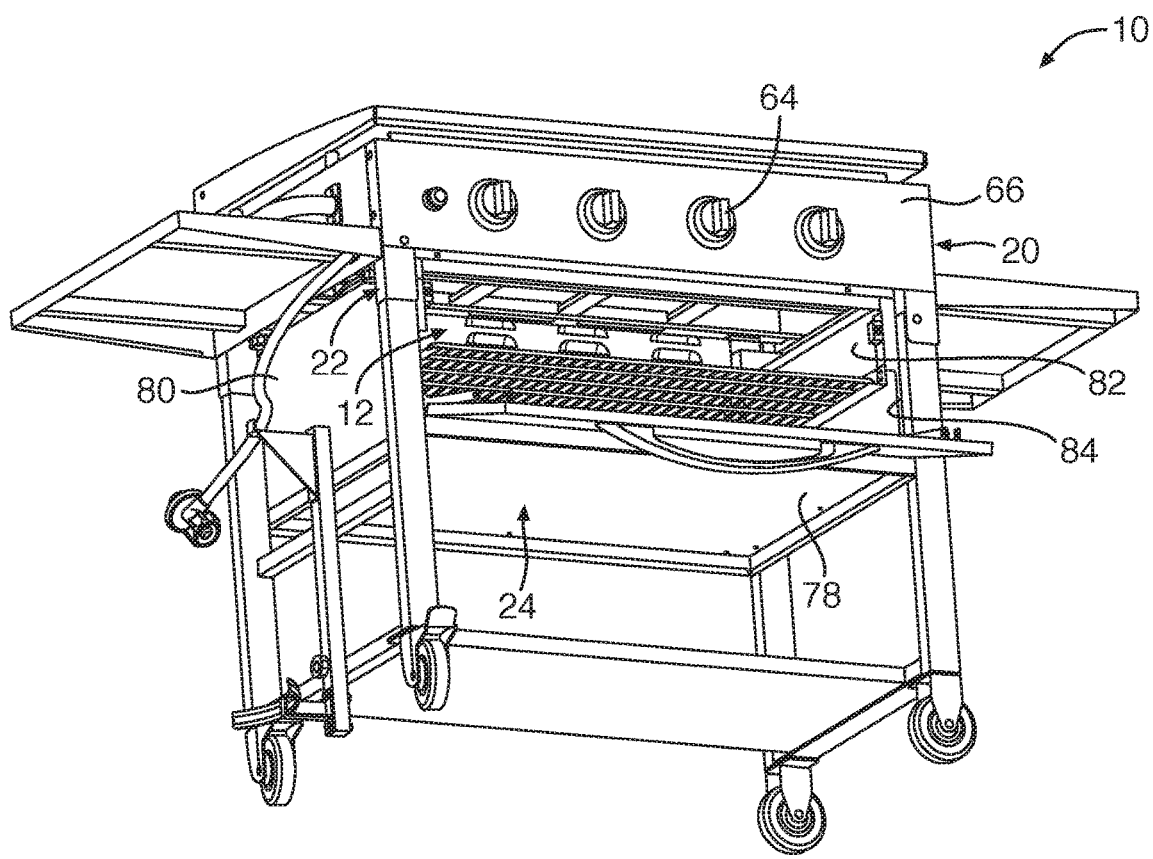
FIG. 6 is a perspective bottom view of the outdoor cooking station with the door in the open position, according to another embodiment of the present invention.
Figure 7:
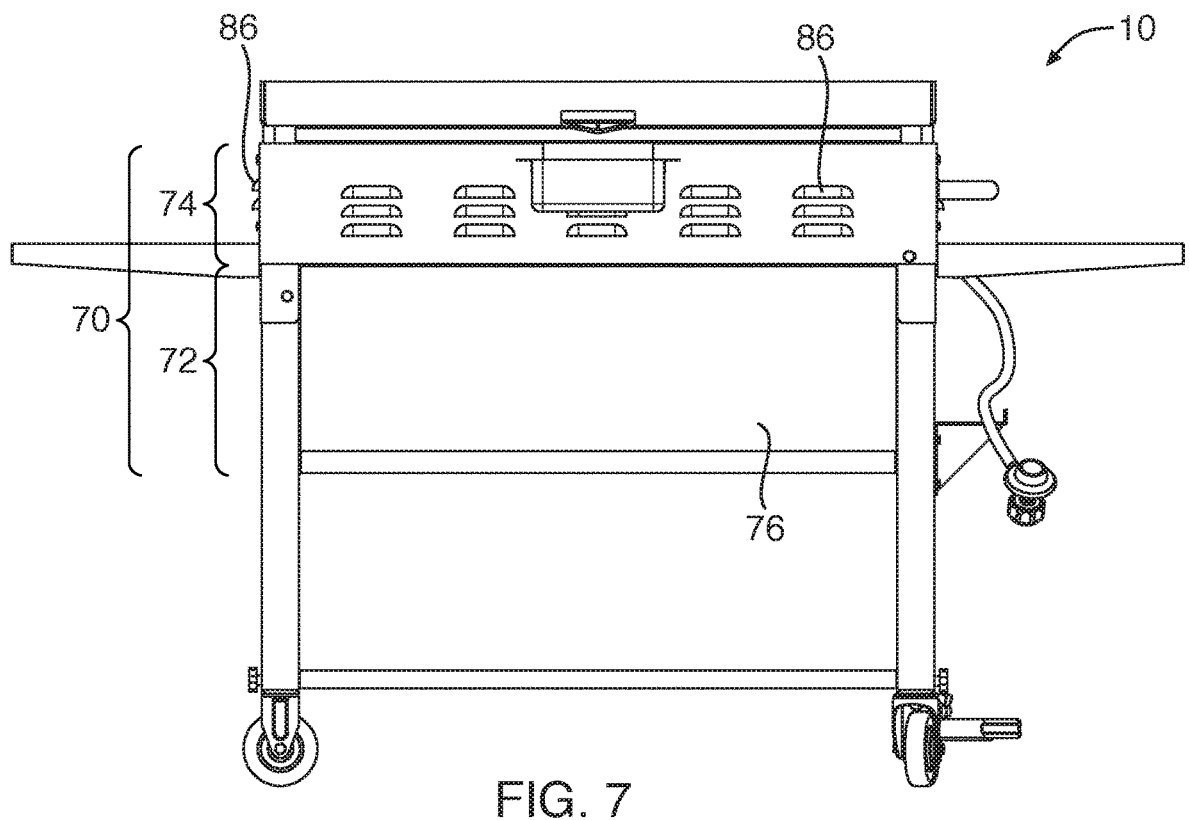
FIG. 7 is a rear view of the outdoor cooking station, according to another embodiment of the present invention.

Now with reference to FIGS. 5, 6 and 7, the warming chamber 12 of the outdoor cooking station 10 will now be described. As previously set forth, the main body 20 of the outdoor cooking station 10 may include the panels 24 extending over the frame components 22 to define the warming chamber 12. Such panels 24 may be coupled to the frame components 22 to define a main chamber 70 extending to define a lower chamber region 72 and an upper chamber region 74, the lower chamber region 72 being directly below the upper chamber region 74, each chamber generally shown in dashed lines in FIG. 5. The upper chamber region 74 may include the heating elements 16 extending across the upper chamber region 74, such as between the front and rear sides 26, 28 of the main body 20. The lower chamber region 72 and/or the main chamber 70 may be referenced as the before described warming chamber 12. Further, the lower chamber region 72 or warming chamber 12 may be fixed relative to the heating elements 16 such that the lower chamber region 72 or warming chamber 12 does not move or pivot or is not associated with a drawer or the like. The main chamber 70 may be defined with the front panel 66 or other front side extending panels, a rear panel 76, a bottom panel 78, and first and second side panels 80, 82. Each of the front panel 66, the rear panel 76, the bottom panel 78, and the first and second side panels 80, 82 may each extend with one or more panels defining such sides. For example, the one or more front side 26 or front panels 66 may extend with one front panel having the burner control valves 64 therewith and another front panel may include a door opening 84 defined therein. Such door opening 84 defined in one of the front panels 66 may include the door 18 pivotably coupled to the main body 20 that may be moveable between the open and closed positions, as previously set forth. Further, such door opening 84 may be sized and configured for a user to readily place cooked food on a tray or the like within the warming chamber 12. Further, some of the first and second side panels 80, 82 and some of the rear panels 76 may include vent structure 86 to prevent the warming chamber 12 from becoming too hot or overheating, for example.

Figure 5:
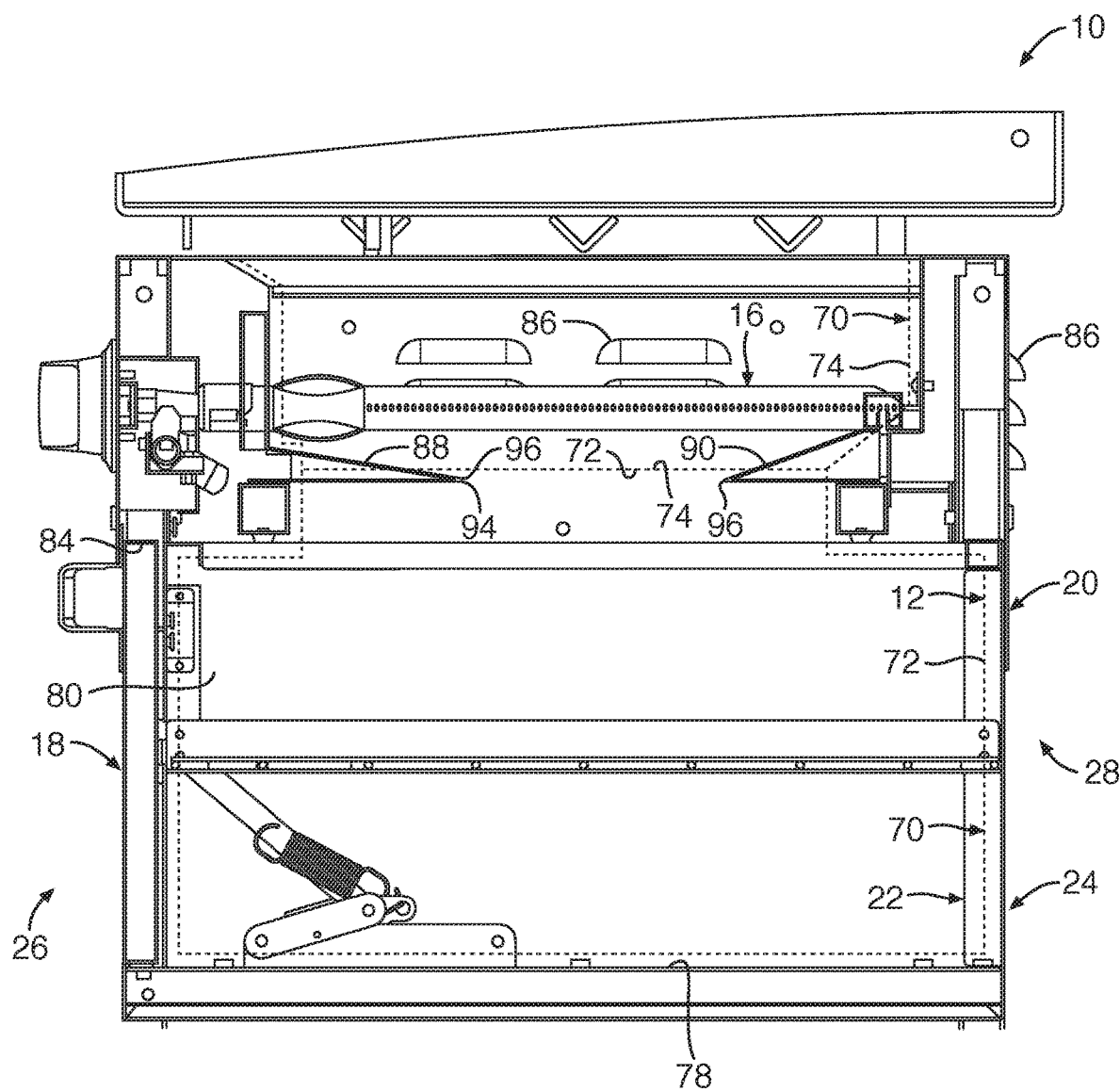
FIG. 5 is a cross-sectional view taken along section A-A of FIG. 4 of the main body of the outdoor cooking station, depicting an upper chamber region above a lower chamber region of a main chamber, according to another embodiment of the present invention.

With reference to FIGS. 4 and 5, the upper chamber region 74 may be separated by one or more inside panels, such as a front inside panel 88 and a rear inside panel 90 each extending between the first and second side panels 80, 82. Such one or more inside panels may include one or more openings, such as vents 92, defined in the one or more inside panels. The front and rear inside panels 88, 90 may each define an inner periphery 94 or edge to define an opening 96 between the respective inner peripheries 94 of the front and rear inside panels 88, 90. In this manner, the vents 92 defined in the one or more inside panels and the opening 96 may be employed to assist heating the lower chamber region 72 with convection and radiation heat supplied by and emanating from the heating elements 16. Further, the front and rear inside panels 88, 90 may be heated by the heating elements 16 to then provide radiation heat to the lower chamber region 72.

Figure 8:
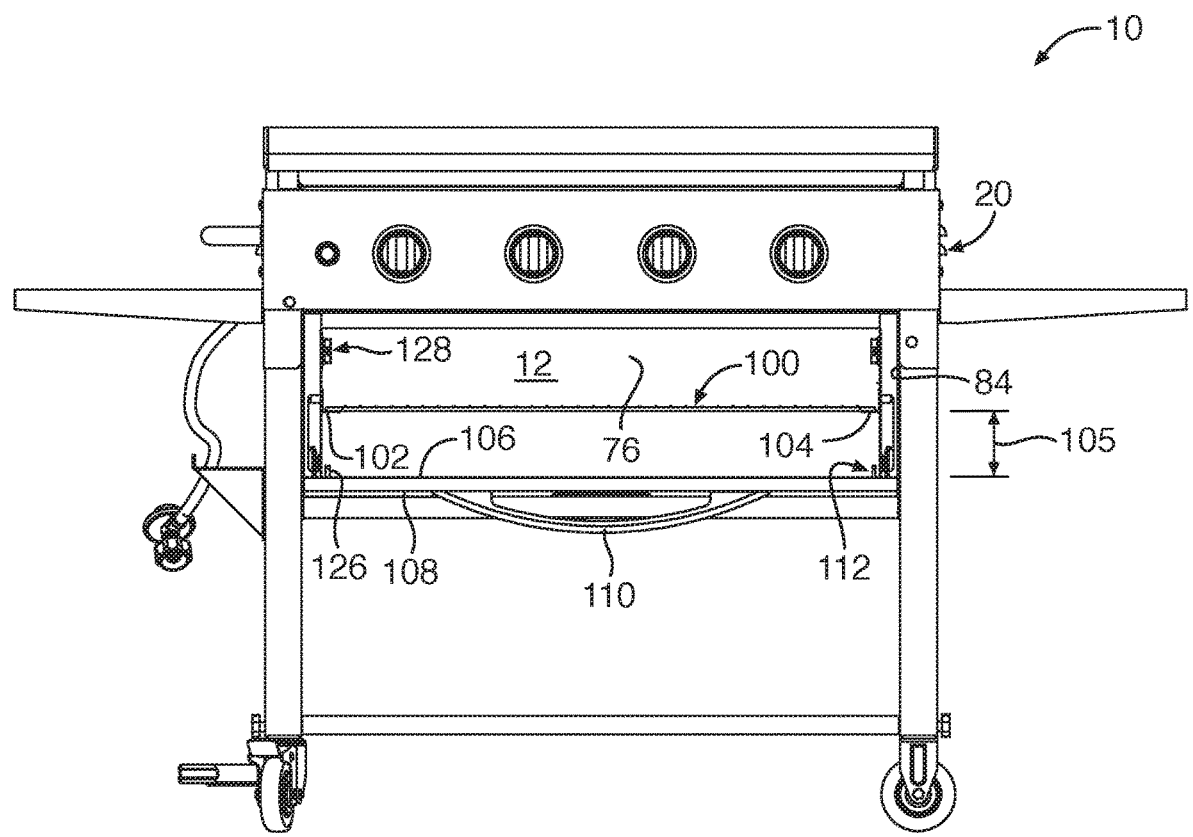
FIG. 8 is a front view of the outdoor cooking station with the door in the open position, according to another embodiment of the present invention.
Figure 9:
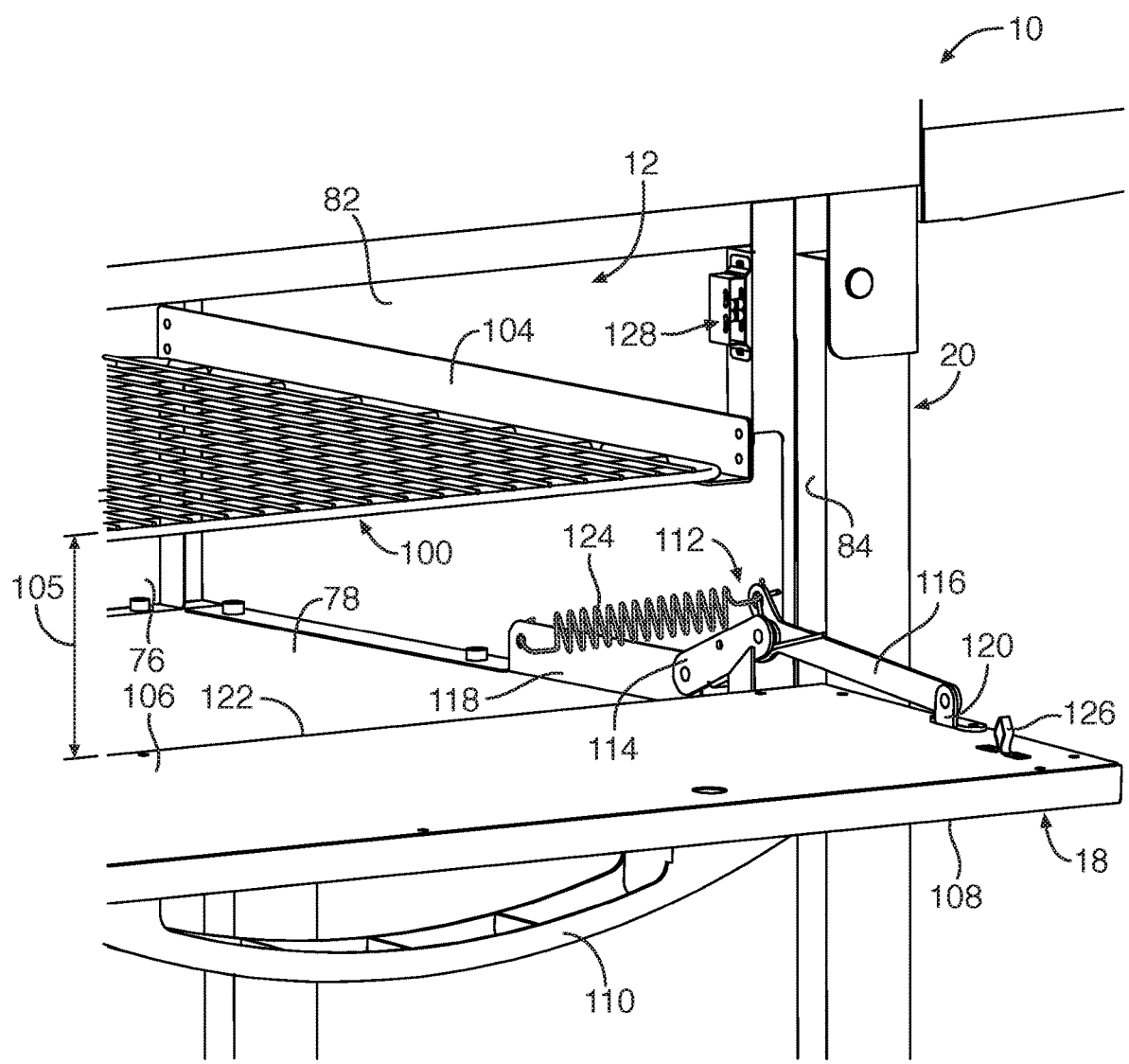
FIG. 9 is an enlarged partial view of the door, according to another embodiment of the present invention.
Figure 10:
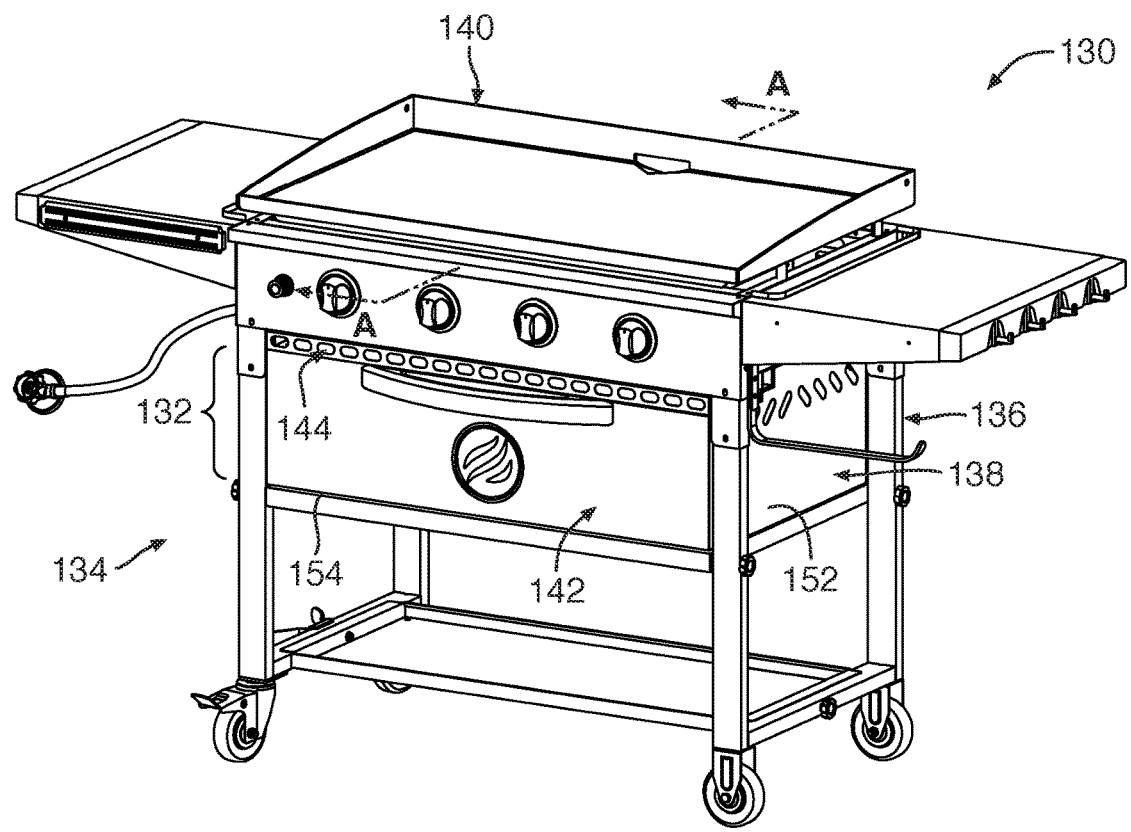
FIG. 10 is a perspective view of another embodiment of an outdoor cooking station with a griddle member positioned thereon, depicting the outdoor cooking station having a warming chamber with a door in the closed position, according to the present invention.

Now with reference to FIGS. 1, 8 and 9, the lower chamber region 72 or warming chamber 12 of the cooking station 10 may include a removable rack 100 or grate like structure. Such removable rack 100 may be suspended over first and second brackets 102, 104 secured to inside surfaces of the main body 20, each bracket 102, 104 including a ledge for the rack 100 to be disposed or rest upon. The rack 100 may be sized to extend a majority of the expanse within the lower chamber region 72 between the first and second side panels 80, 82 and between the rear panel 76 and the door 18. The rack 100 may extend horizontally level and parallel with the bottom panel 78 within the warming chamber 12. Further, the rack 100 may be suspended so as to be positioned a height 105 above the bottom panel 78. In another embodiment, additional brackets may be secured to inside surfaces of the main body 20 so that the rack 100 may be positioned at various heights above the bottom panel 78. In one embodiment, the height 105 of the rack 100 may be positioned to be about half the height of the door opening 84. Such rack 100 may be sized and configured for placing, for example, a tray or the like of cooked food on the rack 100 for maintaining the food in a warm state.

Further, as previously set forth, the door 18 may be pivotably moveable between the open and closed positions. The door 18 may include an inner surface 106 and an outer surface 108 each extending to a rectangular periphery. The outer surface 108 of the door 18 may include a door handle 110 positioned thereon to assist the user to manually move the door 18 to the open and closed positions. The door 18 may be pivotably coupled to the main body 20 with a hinge mechanism 112. For example, the hinge mechanism 112 may include a first elongated part 114 and a second elongated part 116, the first and second elongated parts 114, 116 rotatably coupled together at end portions thereof. At the other end of the first elongated part 114, the first elongated part 114 may be rotatably coupled to a first hinge bracket 118 secured to the main body 20. At the other end of the second elongated part 116, the second elongated part 116 may be rotatably coupled to a second hinge bracket 120 along a mid end portion of the inner surface 106 of the door 18. In one embodiment, such hinge mechanism 112 may include two hinge mechanisms, one coupled adjacent to each of the opposing inner side portions of the main body 20 and door 18. In this manner, the door 18 may be pivotably coupled to the main body 20 so as to pivot about a bottom edge 122 of the door 18. Further, each of the two hinge mechanisms 112 may include a spring 124 associated therewith. Such spring 124 may be coupled between a mid portion of the hinge mechanism 112 and the main body 20 and, more specifically, the spring 124 may extend between an aperture defined in the second elongated part 116 of the hinge mechanism 112 and a bracket aperture defined in the first hinge bracket 118. With this arrangement, the door 18 may be spring biased toward the closed position.

Further, the inner surface 106 of the door 18 may include a protrusion 126 sized and configured to cooperate with a roller catch 128 mounted to the main body 20 within the lower chamber region 72 (see FIG. 5). Such protrusion 126 may define a diamond shaped profile and may be positioned adjacent an upper corner portion of the inner surface 106 of the door 18. The protrusion 126 may cooperate with the roller catch 128 such that the roller catch 128 may include two inward spring biased rollers. With this arrangement, upon closing the door 18, the diamond shaped protrusion 126 is pushed against the roller catch 128 between the rollers such that the protrusion 126 separates the rollers and is caught between the rollers in a spring biased manner. In one embodiment, the inner surface 106 of the door 18 may include two protrusions 126, one at opposite upper corner portions of the door 18 that correspond with two roller catches 128 at opposite upper side and forward positions of the warming chamber 12. In this manner, the door 18 may be maintained in the closed position with both the spring 124 biasing the door 18 in the closed position as well as being held shut with the protrusion 126 and roller catch 128 arrangement.

Now with reference to FIGS. 1 and 2, a user may ignite the heating elements 16 (FIG. 3) with the igniter switch 68 after opening the valve of, for example, a propane tank and turning one or more of the burner control valves 64 to an on position. As the user is heating the cooking surface 60 of, for example, a griddle member 14, the heating elements 16 also supply convection heat and radiation heat to the warming chamber 12 below the heating elements 16. Further, the heating elements 16 may provide heat to the front and rear inside panels 88, 90, which may then provide radiation heat to the lower chamber region 72 or warming chamber 12. As the user completes cooking a batch of food, the user may open the door 18 of the warming chamber 12 and place the cooked food over the rack 100 in the warming chamber 12. The user may then close the door 18 of the warming chamber 12 to maintain and build the heat within the warming chamber 12. The user may then continue to cook food on the griddle member 14 while also maintaining the already cooked food in a warm state. In this manner, the warming chamber 12 of the outdoor cooking station 10 may be employed to maintain cooked food in a warm state while continuing to actively cook food on the griddle member 14.

Now with reference to FIGS. 10-13, another embodiment of an outdoor cooking station 130 with a warming chamber 132 is provided. The outdoor cooking station 130 may include similar structural features as described in the previous embodiment including a main body 134 defined with frame components 136 and panels 136 sized to support heating elements (not shown) and a griddle member 140. Further, the outdoor cooking station 130 may include a door 142 for accessing the warming chamber 132. In this embodiment, the warming chamber 132 may at least partially be defined with a baffle 144. As in the previous embodiment, the warming chamber 132 may be defined with a bottom panel 146, a rear panel 148, and first and second side panels 150, 152, each of which may define an external portion of the main body 134. Further, the warming chamber 132 may also be defined with the door 142 that may be hingably opened and closed (see FIGS. 10 and 11) along a bottom side 154 of the door 142 to expose a chamber opening 160 and the warming chamber 132, the chamber opening 160 may be defined by front side edges of each of the baffle, bottom panel 146, and first and second side panels 150, 152. Along an upper side of the warming chamber 132, such upper side may be exposed to the heating elements, similar to that described in the previous embodiment, but also may include the baffle 144 along the upper side to at least partially shield the warming chamber 132 from some gas carrying components of the cooking station 130 as well as direct heat to the warming chamber.

Figure 11:
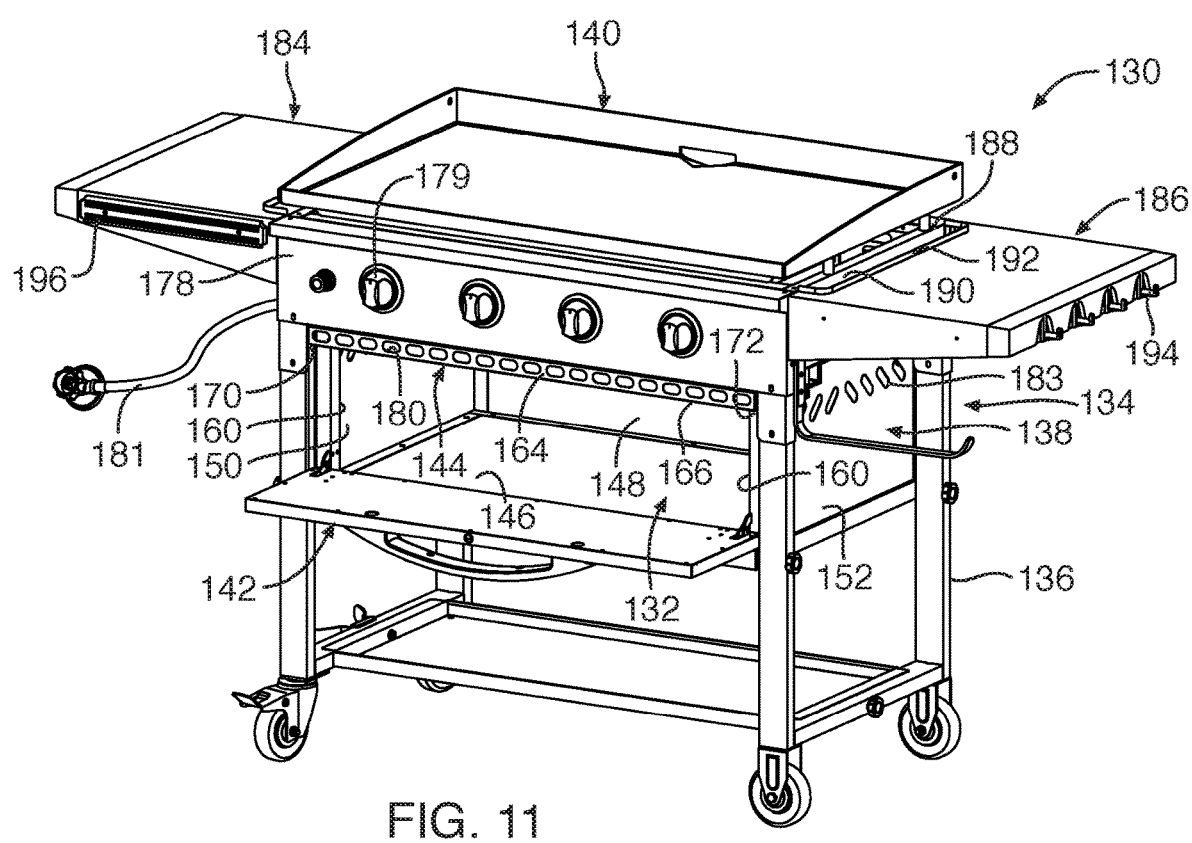
FIG. 11 is a perspective view of the outdoor cooking station of FIG. 10, depicting the door of the warming chamber in the open position, according to another embodiment of the present invention.
Figure 12:
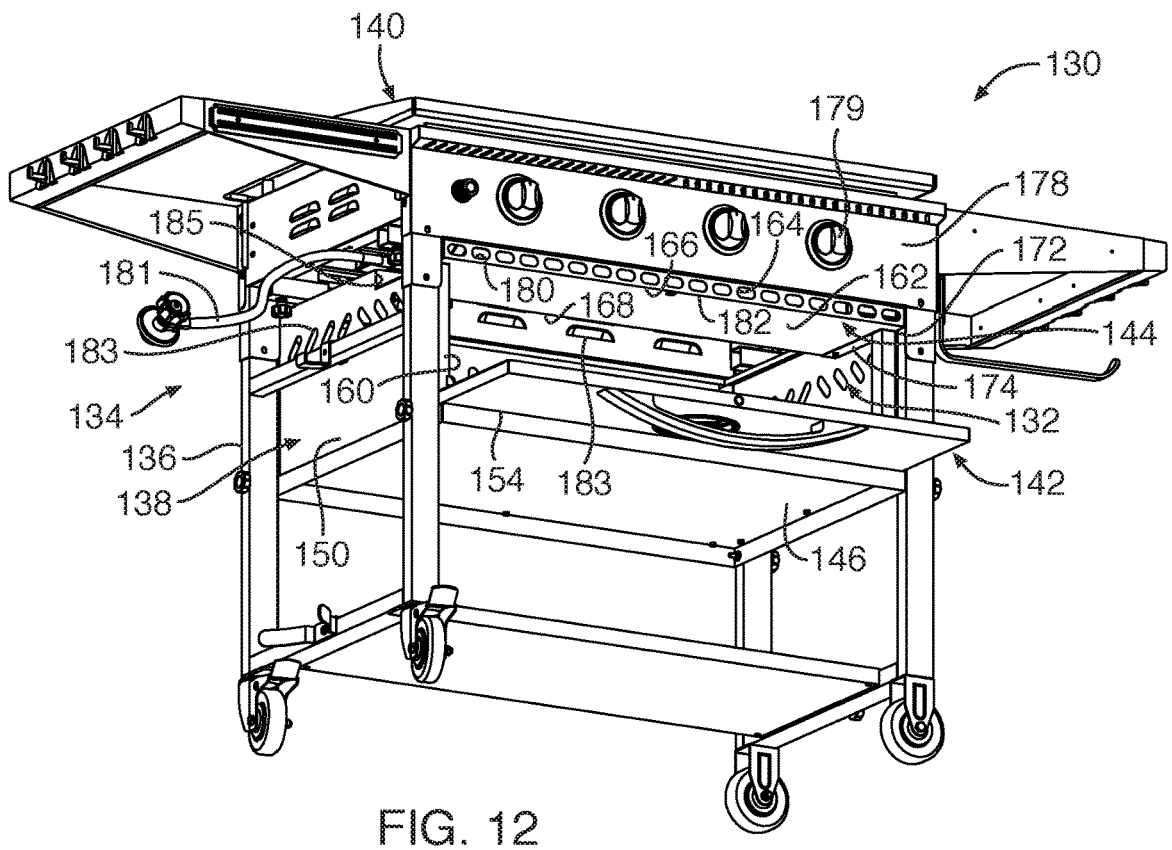
FIG. 12 is a perspective bottom view of the outdoor cooking station of FIG. 10, depicting a baffle positioned within the main body of the cooking station, according to another embodiment of the present invention.
Figure 13:
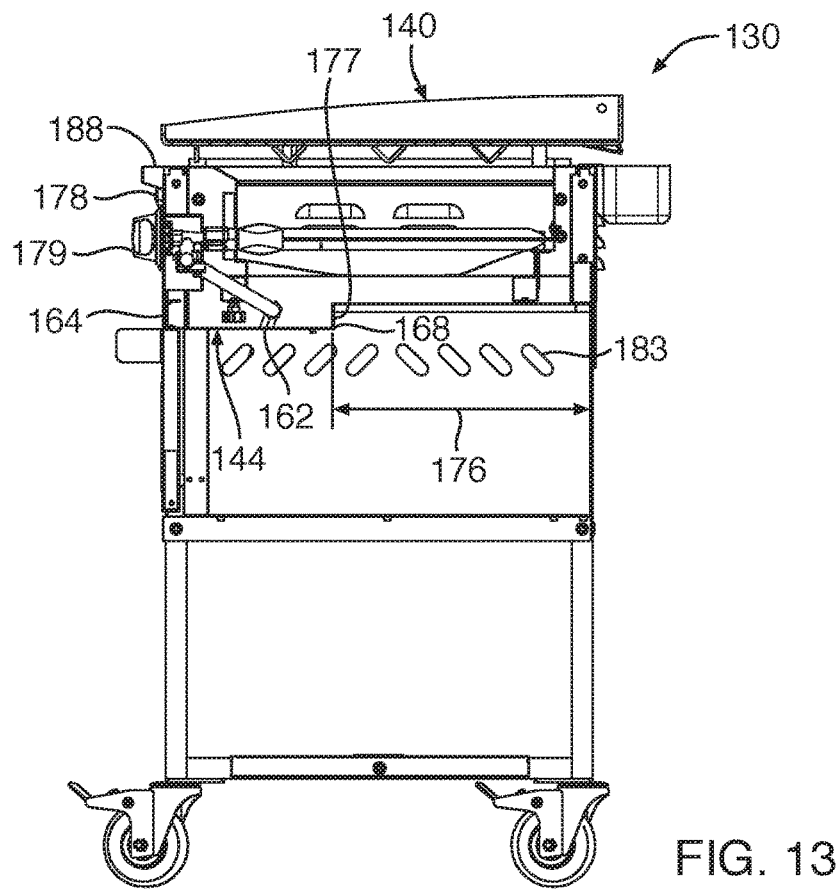
FIG. 13 is a cross-sectional view taken along section line A-A of FIG. 10, according to another embodiment of the present invention.

With reference to FIGS. 11-13, the baffle 144 may include an upper side panel 162 and a front facing vent 164. In one embodiment, the upper side panel 162 may be integrally formed with the front facing vent 164. The upper side panel 162 may be sized and configured to extend and at least partially define the upper side or ceiling of the warming chamber 132. The baffle 144 or upper side panel 162 may extend with an elongated length, a width and a thickness, the thickness being a thickness of, for example, typical sheet metal. The baffle 132 may extend with a front edge 166, a rear edge 168 and first and second edges 170, 172, the first edge 170 being opposite the second edge 172 and the front edge 166 being opposite the rear edge 168. The baffle 144 or upper side panel 162, adjacently along the first and second edges 170, 172 of the upper side panel 162, may be supported by supporting members 174 fixated to an internal surface, such as the first and second side panels 150, 152, of the warming chamber 132. With the upper side panel 162 positioned over the supporting members 174, the upper side panel 162 may extend reward toward rear panel 148, but only extend to about a mid-point or intermediate point rearward along the main body 134 so as to leave a gap 176 between the rear edge 168 and the rear panel 148. As such, the upper side panel 162 extends with the width so as to leave the gap 176 so that the warming chamber 132 may be directly exposed to the heating elements positioned above the baffle 144 and within the main body 134. The rear edge 168 of the baffle 144 may also include an upstanding portion 177 extending upward along the length of the rear edge 168 of the upper side panel 162. Such upstanding portion 177 may extend upward to a height similar to the front facing vent 164 or shorter. Further, the upstanding portion 177 may extend parallel relative to the front facing vent 164 and may be oppositely positioned relative to the front facing vent such that the front edge 166 of the upper side panel 162 exhibits the front facing vent 164 and the rear edge 168 exhibits the upstanding portion 177. In this manner, the upper side panel 162 and the upstanding portion 177 of the baffle 144 may be sized and configured to direct heat to the warming chamber 132 and at least partially shield and protect the gas carrying components of the outdoor cooking station 130 from heat so as to maintain a safe temperature.

The front facing vent 164 may be sized and configured to be positioned along the front edge 166 of the upper side panel 162. The front facing vent 164 may be an elongated flat structure extending horizontally directly above the front edge 166 of the upper side panel 162 and may extend upward toward a front panel 178, the front panel 178 holding control valves 179 of the outdoor cooking station 130. Further, the front facing vent 164 may be inset inward relative to the front panel 178. The front facing vent 164 may define multiple openings 180 therein, the openings 180 extending through the front facing vent 164 and sized and configured to vent external air therethrough. The multiple openings 180 may be positioned in an aligned arrangement so as to extend in a single row horizontally along the front facing vent 164. The multiple openings 180 may each exhibit a circular profile, such as an oval type profile, that may be elongated horizontally. In another embodiment, the multiple openings 180 of the front facing vent 164 may be positioned with multiple elongated slots defined in the front facing vent, or with any other suitable profile that facilitates air flow therethrough.

The front facing vent 164 may be integrally formed with the upper side panel 162 so as to define a bend 182 between the upper side panel 162 and the front facing vent 164. The front facing vent 164 may extend with a planar structure that may extend substantially orthogonal relative to the upper side panel 162 of the baffle 144. In another embodiment, the front facing vent 164 may be positioned substantially parallel relative to the front panel 178 of the main body 134 so as to be offset relative to the front panel 178. In another embodiment, the front facing vent 164 may be positioned along the front side of the main body 134 with the upper side panel 162 extending therefrom at an acute or obtuse angle, instead of the orthogonal arrangement, previously set forth. In another embodiment, the front facing vent 164 may be fixed to the upper side panel 162 with fasteners. In another embodiment, the front facing vent 164 may be fixated to the main body 134 with the fasteners such that a lower edge of the front facing vent 164 extends alongside the front edge 166 of the upper side panel 162. With this arrangement, the front facing vent 164 and the upper side panel 162 may be employed to protect various components of the outdoor cooking station 130 from over-heating. Further, the multiple openings 180 defined in the front facing vent 164 may be sized and configured facilitate external air-flow to the gas carrying components of the cooking station, such as the tubing 181, manifold, valve components, etc., to maintain a safe temperature for such components. For example, the tubing 181 may extend in a space 185 defined above the upper side panel 162 and between the front facing vent 164 (adjacent the openings 180) and the upstanding portion 177 of the baffle 144. As such, the baffle 144 may direct heat to the warming chamber 182 as well as define the space 185 for maintaining a safe temperature for gas carrying components of the outdoor cooking station 130.

Further, the first and second side panels 150, 152 and the rear panel 148 of the warming chamber 132 may also exhibit vents 183 formed therein to ensure that an appropriate amount of external air flow may fuel the gas flame of the heating elements. This is especially important for outdoor cooking stations having a griddle member positioned thereon or for when a hood is covering a top side of a given cooking station.

As depicted in FIG. 11, the warming chamber 132 may not include a removable shelf therein, as described in previous embodiments. Rather, the bottom panel 146 of the warming chamber 132 may facilitate supporting food or the like that the user may desire to keep warm. Further, with reference to FIGS. 10 and 11, the main body 134 may include first and second side shelves 184, 186 that may be substantially level with an upper edge 188 of the main body 134. Each of the first and second side shelves 184, 186 may include an elongated opening 190 and ridge 192 arrangement to discourage users of the outdoor cooking station 130 from placing objects on an upper surface of the side shelves that may be too close to the griddle member 140 and the hot air flowing out from under the griddle member 140, similar to that disclosed in commonly owned U.S. patent application Ser. No. 16/364,012, filed on Mar. 25, 2019, the entire contents of which are incorporated herein by reference. Further, the first and second side shelves 184, 186 may include various hooks 194 and/or a magnetic strip 196 along a readily accessible surface (other than an upward facing surface) of the first and second side shelves 184, 186 for supporting, for example, cooking utensils. Further, the door 142 may be biased to a closed position with a spring (not shown) such as that described in the previous embodiment, or the door 142 may be maintained in the closed position with magnets positioned or integrated within a top edge of the door and/or adjacent the baffle or with any other suitable coupling structure or means for holding the door 142 in the closed position.

The various structural components of the outdoor cooking station described herein and any other structural components thereof or associated therewith may be formed of various metallic materials, such as steel, stainless steel, copper, aluminum or any other suitable material with high temperature ratings, such as various suitable polymeric materials, and may be formed from known structural components, such as sheet metal at various gauges/thicknesses or other known metallic structures, such as tubing or the like, and may be formed and manufactured through various known processes and techniques known in the art, such as casting, welding, rolling, bending, pressing, fastening, etc., as known by one of ordinary skill in the art.

While the invention may be susceptible to various modifications and alternative forms, specific embodiments have been shown by way of example in the drawings and have been described in detail herein. Further, the structural features of any one embodiment disclosed herein may be combined or replaced by any one of the structural features of another embodiment set forth herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. An outdoor cooking station for cooking food and maintaining cooked food in a warmed state, the outdoor cooking station comprising:
a main body with frame components and panels extending to define a front side, a rear side, a left side, and a right side, the panels coupled to the frame components so as to extend and define a warming chamber, the warming chamber positioned below gas flame burners supported by the main body and extending between the front side and the rear side, the gas flame burners positioned below a griddle having a flat cooking surface configured to be associated with the main body, the warming chamber fixedly positioned relative to the gas flame burners, the main body including a door pivotably coupled to the main body and positioned along the front side of the main body, the door pivotably moveable between an open position and a closed position such that, in the open position, the door exposes an opening defined in the front side of the main body to facilitate access to the warming chamber to place the cooked food therein;
wherein the main body comprises a baffle extending to define an upper side panel and a front facing vent, the upper side panel positioned to at least partially define an upper side of the warming chamber, the front facing vent having openings defined therein and positioned above the door so that the front facing vent extends upward from the upper side panel.

2. The outdoor cooking station of claim 1, wherein the main body comprises a baffle extending with an upper side panel and a front facing vent, the front facing vent extending perpendicular relative to the upper side panel, the front facing vent positioned above the door with openings defined therein and the upper side panel partially defining the warming chamber.

3. The outdoor cooking station of claim 1, wherein the door pivots adjacent a bottom edge of the opening defined in the front side of the main body.

4. The outdoor cooking station of claim 1, wherein the warming chamber comprises a removable rack, the removable rack suspended over oppositely positioned ledges within the warming chamber.

5. The outdoor cooking station of claim 1, wherein the warming chamber is at least partially defined by a bottom panel, a first panel, a second panel, and a rear panel, the first panel being positioned opposite the second panel, the rear panel being positioned opposite the door in the closed position, the warming chamber being at least partially open and exposed to the gas flame burners positioned above the warming chamber.

6. The outdoor cooking station of claim 5, wherein the warming chamber comprises one or more inside panels extending laterally relative to the rear panel, the one or more inside panels extending to define an opening to facilitate convection and radiation heat from the gas flame burners to heat the warming chamber.

7. An outdoor cooking station, comprising:
a main body with frame components and panels extending to define a front side, a rear side, a left side, and a right side, the panels coupled to the frame components so as to extend and define an upper chamber region and a lower chamber region, the upper chamber region including multiple gas flame burners supported by the main body extending between the front side and the rear side and disposed below an upper edge of the main body, the upper edge extending adjacent a griddle having a flat cooking surface configured to be associated with the main body, the lower chamber region fixedly positioned relative to the upper chamber region and disposed directly below the upper chamber region and the gas flame burners, the panels of the lower chamber region extending to define a bottom panel, a rear panel, a first panel and a second panel, the first panel being positioned opposite the second panel, the rear panel being positioned opposite a door pivotably coupled to the main body, the door pivotably moveable to an open position to facilitate access to the lower chamber region;

wherein the main body comprises a baffle extending to define an upper side panel and a front facing vent, the upper side panel positioned to at least partially define an upper side of the warming chamber, the front facing vent having openings defined therein and positioned above the door so that the front facing vent extends upward from the upper side panel.

8. The outdoor cooking station of claim 7, wherein the door is coupled to a hinge mechanism with a spring coupled thereto such that the door is biased to a closed position.

9. The outdoor cooking station of claim 7, wherein the lower chamber region comprises a rack suspendably positioned between the first and second panels.

10. The outdoor cooking station of claim 7, wherein the upper chamber region is separated from the lower chamber region with one or more inside panels, the one or more inside panels defining one or more vents therein to facilitate convection and radiation heat from the gas flame burners to heat the lower chamber region.

11. The outdoor cooking station of claim 7, wherein the upper chamber region is separated from the lower chamber region with one or more inside panels, the one or more inside panels extending to define an opening along an edge of the one or more inside panels, the opening configured to supply heat to the lower chamber region from the gas flame burners.

* * * * *